United States Patent
Frey et al.

(10) Patent No.: US 7,054,663 B2
(45) Date of Patent: May 30, 2006

(54) METHOD FOR POLAR DIAGRAM SHAPING IN A RADIO COMMUNICATIONS SYSTEM

(75) Inventors: Thomas Frey, Ulm (DE); Markus Reinhardt, Neu-Ulm (DE); Gottfried Schnabl, Ulm (DE); Alexander Seeger, Feldkirchen (DE); Ingo Viering, Ulm (DE)

(73) Assignee: Siemens Aktiengesellschaft, Munich (DE)

( * ) Notice: Subject to any disclaimer, the term of this patent is extended or adjusted under 35 U.S.C. 154(b) by 387 days.

(21) Appl. No.: 10/209,667

(22) Filed: Aug. 1, 2002

(65) Prior Publication Data

US 2003/0027599 A1 Feb. 6, 2003

(30) Foreign Application Priority Data

Aug. 1, 2001 (DE) ................................. 101 37 580
Aug. 1, 2001 (EP) ................................. 01118546

(51) Int. Cl.
H04M 1/00 (2006.01)
(52) U.S. Cl. ..................... 455/562.1; 455/561; 342/360
(58) Field of Classification Search ............... 455/63.1, 455/67.13, 561, 562.1; 342/360, 367, 373
See application file for complete search history.

(56) References Cited

U.S. PATENT DOCUMENTS

| 4,431,995 A | | 2/1984 | Barton et al. | |
| 6,101,399 A | * | 8/2000 | Raleigh et al. | ............. 455/561 |
| 6,151,513 A | | 11/2000 | Petry et al. | |
| 6,208,294 B1 | * | 3/2001 | Kobayakawa et al. | ...... 342/373 |
| 6,377,783 B1 | * | 4/2002 | Lo et al. | ...................... 455/101 |
| 6,397,082 B1 | | 5/2002 | Searle | |
| 6,433,737 B1 | * | 8/2002 | Katz | .......................... 342/367 |
| 6,665,545 B1 | * | 12/2003 | Raleigh et al. | .......... 455/562.1 |

FOREIGN PATENT DOCUMENTS

| DE | 31 10 532 C2 | 1/1982 |
| DE | 195 35 441 A1 | 3/1997 |
| DE | 695 04 867 T2 | 2/1999 |
| GB | 2335572 | 9/1999 |

OTHER PUBLICATIONS

A Novel Beamformer with Multiple Signal Reception for GPS Receivers, Lin et al. (Antennas and Propagation for Wireless Communications, 2000 IEEE-APS Conference on Nov. 6-8, 2000 pp.: 171-174).*

Chryssomallis, "Smart Antennas", Wireless Corner, IEEE Antennas and Propagation Magazine, vol. 42, No. 3, Jun. 2000, XP-000936720, pp. 129-136.

(Continued)

*Primary Examiner*—Edan Orgad
*Assistant Examiner*—Raymond S. Dean
(74) *Attorney, Agent, or Firm*—Staas & Halsey LLP

(57) ABSTRACT

A method forms polar diagrams in a connection between a subscriber and a base station with an antenna arrangement in a radio communications system using multiple access methods. Antenna signals are associated with polar diagrams of the antenna arrangement by a common beam forming network. The common beam forming network is used to form weighted sum signals, which are passed as input signals to a user-specific beam forming unit. A selector which is arranged there takes from the input signals a user-specific subset Kc of signals, to which an eigen polar diagram forming algorithm is applied.

14 Claims, 4 Drawing Sheets

OTHER PUBLICATIONS

Brunner et al., "Space-Time Eigenrake and Downlink Eigenbeamformer: Exploiting Long-Term and Short-Term Channel Properties in WCDMA", Jan. 12, 2000, XP-002185838, pp. 138-142.

* cited by examiner

METHOD FOR POLAR DIAGRAM SHAPING IN A RADIO COMMUNICATIONS SYSTEM

CROSS REFERENCE TO RELATED APPLICATIONS

This application is based on and hereby claims priority to German Application No. 10137580.8 filed on Aug. 1, 2001 and European Application No. 01118546.9 filed on Aug. 1, 2001, the contents of which are hereby incorporated by reference.

BACKGROUND OF THE INVENTION

The invention relates to a method for polar diagram forming in a connection between a subscriber and a base station with adaptive antenna arrangement in a radio communications system using multiple access methods.

Various concepts are known for improving the reception for connections between a subscriber and a base station in radio communications systems, in particular mobile radio systems.

By way of example, a first concept for this purpose uses a phased array antenna arrangement as the antenna arrangement at the base station for receiving subscriber signals in an uplink connection, with the antenna arrangement having a number of individual antennas and a number of polar diagrams. Each individual one of the polar diagrams is in this case currently aligned with a three-dimensional area, in order to supply this area. A subscriber signal which is sent by an individual subscriber is received as antenna signals via the individual antennas and depending on the number of the individual antennas, and these antenna signals are passed, with the aid of a common beam forming unit, as weighted sum signals to outputs of the beam forming unit. In this case, each output of the beam forming unit has one, and only one, associated polar diagram.

The weighted sum signals are passed to a user-specific polar diagram selection circuit, which is connected downstream of the beam forming unit, for further processing, the output from which once again contains not only the signal from a desired subscriber but also a subset of signals from further subscribers who are physically associated with the same polar diagram as the desired subscriber.

Thus, in this first concept, common polar diagram forming is carried out for all the subscribers, and for their subscriber signals, at the base station. Depending on their respective location, the individual subscriber signals are effectively amplified or attenuated on reception by the polar diagrams and by their polar diagram characteristic, with each individual polar diagram once again being associated with one, and only one, of the outputs of the beam forming unit.

The implementation of the first concept, which can be carried out in a very robust manner, makes it possible to improve both the supply and the system capacity of the radio communications system. Furthermore, it is possible to suppress disturbing interference signals from subscribers who are located, in comparison to a first subscriber, in a physical area which is associated with an adjacent polar diagram. It is impossible to suppress disturbing interference signals from subscribers who are supplied jointly using the same polar diagram.

The three-dimensional resolution is reduced by selecting a limited number of preformed polar diagrams.

In a second concept, an antenna arrangement with individual antennas is used for receiving subscriber signals at the base station. However, there is no longer rigid association between fixed polar diagrams or physical areas and the subscribers, and the antenna signals which are received by the individual antennas are instead of this processed directly and on a user-specific basis, that is to say the individual antenna signals are adaptively combined with one another. In radio communications systems using CDMA multiple access methods, this is done, by way of example, using an "eigen beam former".

This second concept is characterized by the radio communications system having a full adaptation capability to the respective transmission and interference situation. Good capabilities to suppress disturbing interference signals are obtained by technically proven algorithms and user-specific, adaptive calculation of any desired polar diagrams (beams). This makes it possible to optimize a received signal in terms of noise and interference, and this is done using a signal-to-noise and interference ratio value (SINR).

However, this involves a high level of complexity and increased computation complexity owing to the user-specific processing of the subscriber signals, for example by the eigen beam former, and this is particularly true when processing spread spectrum received signals.

SUMMARY OF THE INVENTION

One aspect of the invention is based on the object of using a user-specific adaptive evaluation to optimize the reception of subscriber signals in terms of a signal-to-noise and interference ratio value for a connection within a radio communications system, while at the same time reducing the complexity which this results in.

A reception situation is matched to a predetermined SINR value by the combination, of the common beam forming network, with whose aid signal preprocessing and polar diagram preselection are carried out on the one hand, and of the user-specific beam forming unit on the other hand.

Compared with the exclusive user-specific processing of the antenna or subscriber signals, the combination makes it possible, with an essentially constant SINR value, to achieve a reduction in the complexity and a reduction in the computation effort with only a small amount of additional hardware and software, and to achieve a reduction in the data rate.

The user-specific selection of a subset of polar diagrams, which is advantageously carried out with the aid of a selector, and further processing with the aid of, for example, an eigen beam former, allow energy concentration. Three-dimensional preprocessing is provided by the common beam forming network. The selector is used to select those input signals to the beam forming unit which form an optimum ratio between the respective subscriber useful signal and the disturbing interference signals and noise, or whose-specific weighting combination forms an optimum ratio between the respective subscriber useful signal and the disturbing interference signals and noise.

Use of the common beam forming network and optimized user-specific algorithms in the beam forming unit make it possible to achieve an adaptable tradeoff between the complexity on the one hand and the system capacity on the other hand. Compared with the individual concepts, the combination of the first concept and the second concept allows the tradeoff to be made essentially without any restrictions or disadvantages. For example, viewed from a theoretical standpoint, the individual antennas and the individual polar diagrams (transformed domain) are the same as one another if all Kb outputs of the common beam forming network are selected by the selector for further processing in the user-specific beam forming unit.

The advantage of three-dimensional preprocessing with the aid of the common beam forming network is that it is possible to set up suitable signal relationships (energy concentrations) which allow the adaptive, user-specific algorithms to be designed in a simpler manner, or allow their dimensions to be reduced.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
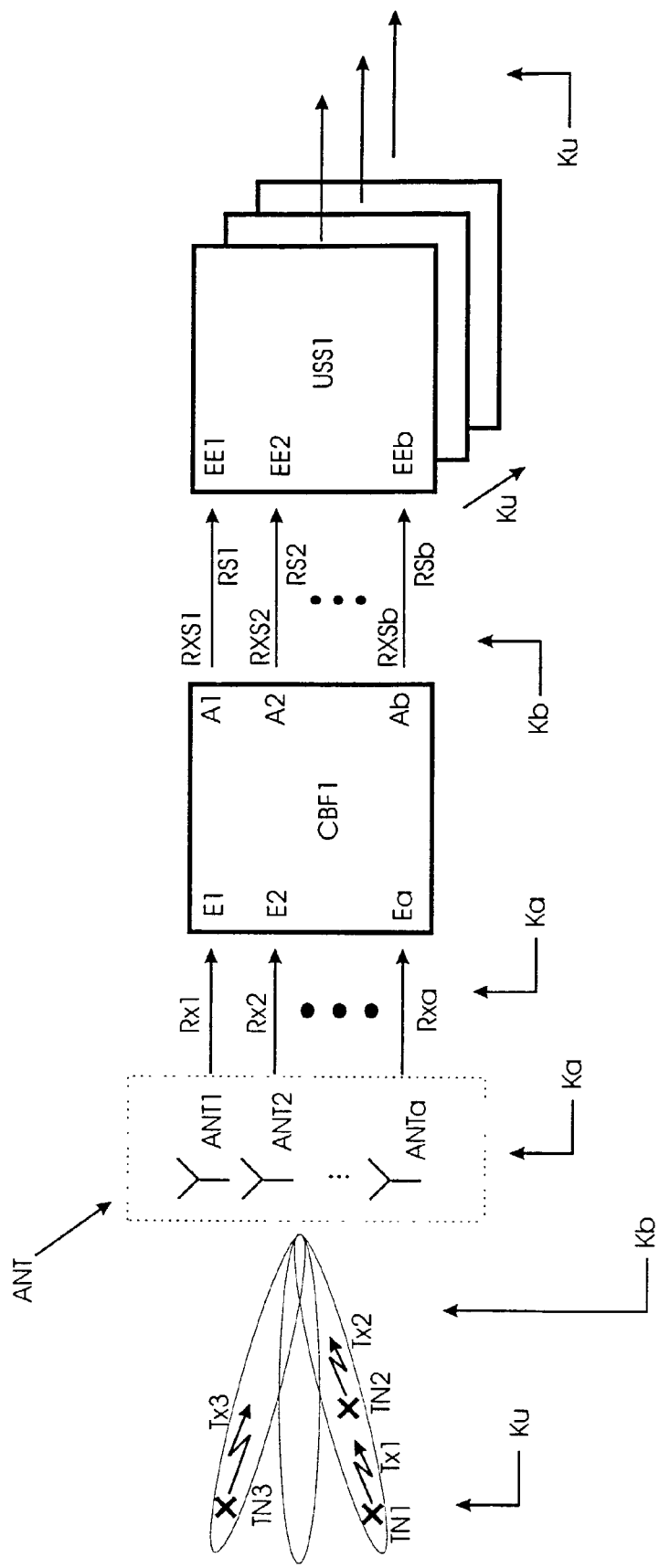
FIG. 1 shows a method for joint polar diagram forming according to the related art.

Reference will now be made in detail to the preferred embodiments of the present invention, examples of which are illustrated in the accompanying drawings, wherein like reference numerals refer to like elements throughout.

FIG. 1 shows a method for joint polar diagram forming according to the related art.

A signal Tx1 which is sent by a first subscriber TN1 is received by an adaptive antenna arrangement ANT. The antenna arrangement is, by way of example, in the form of a phased array antenna arrangement and has a total of Kb polar diagrams, which are arranged horizontally offset with respect to one another, so that each individual polar diagram provides fixed coverage of a respective three-dimensional area of the radio communications system.

In order to produce the Kb polar diagrams, the antenna arrangement ANT has a total of Ka individual antennas ANT1, ANT2, . . . , ANTa, via which subscriber signals are received from a total of Ku subscribers. The individual antennas ANT1 to ANTa receive the signal Tx1 which has been sent by the first subscriber TN1 as Ka antenna signals Rx1, Rx2, . . . , Rxa, which are passed as input signals to a common network for polar diagram forming, the beam forming network CBF1, which thus has Ka inputs E1, E2, . . . , Ea for receiving the Ka antenna signals Rx1 to Rxa, and has a total of Kb outputs A1, A2, . . . , Ab. In this case, each individual one of the Kb outputs A1 to Ab is permanently associated with one, and only one, of the Kb polar diagrams.

The common beam forming network CBF1 is used to combine the Ka antenna signals Rx1, Rx2, . . . , Rxa from the first subscriber TN1 to form Kb weighted sum signals RXS1, RXS2, . . . , RXSb, which are passed to the individual Kb outputs A1 to Ab of the common beam forming network CBF1. Each individual sum signal RXS1 to RXSb can thus be associated with one, and only one, of the Kb polar diagrams, depending on the respective output A1 to Ab. Its sum signals are of different intensity, and thus have different weightings, depending on the position of the subscriber TN1 in the radio communications system.

This association process is carried out jointly for all Ku subscribers, with the sum signals RXS1 to RXSb which are formed in this way for an individual subscriber being passed together with those from all the other subscribers as overall signals RS1, RS2, . . . , RSb via the respectively associated outputs A1, A2, . . . , Ab of the common beam forming network CBF1 as input signals to Kb inputs EE1, EE2, . . . , Eeb of a user-specific polar diagram selection circuit USS1 for further processing. This is used to produce an output signal for each individual subscriber, which output signal contains not only the signal from a desired subscriber but also a subset of signals from those subscribers who are physically associated with the same polar diagram. By way of example, the output signal for the desired subscriber TN1 also contains signal components from a subscriber TN2.

The common beam forming network CBF1 may in this case contain a Butler matrix, with an N×N Butler matrix, in each case having the same number of inputs and outputs, preferably being used. The respective sum signal is in this case formed on a carrier-frequency basis, is then converted to baseband and is then converted from analog to digital form, and is not illustrated here, while user-specific further processing is then carried out in baseband. In the same sense, it is also possible to first of all convert the individual antenna signals to baseband, with the sum signal formation and user-specific further processing being carried out subsequently.

The method described here is characterized by the low level of complexity in the radio communications system, which is achieved by the common beam forming network CBF1 and the subsequent user-specific selection of each individual one of the Ku subscriber signals.

The selection of a limited number of preformed polar diagrams reduces the three-dimensional resolution. Furthermore, with this method, it is impossible to suppress interference signals which are physically associated with the same polar diagram.

Figure 2:
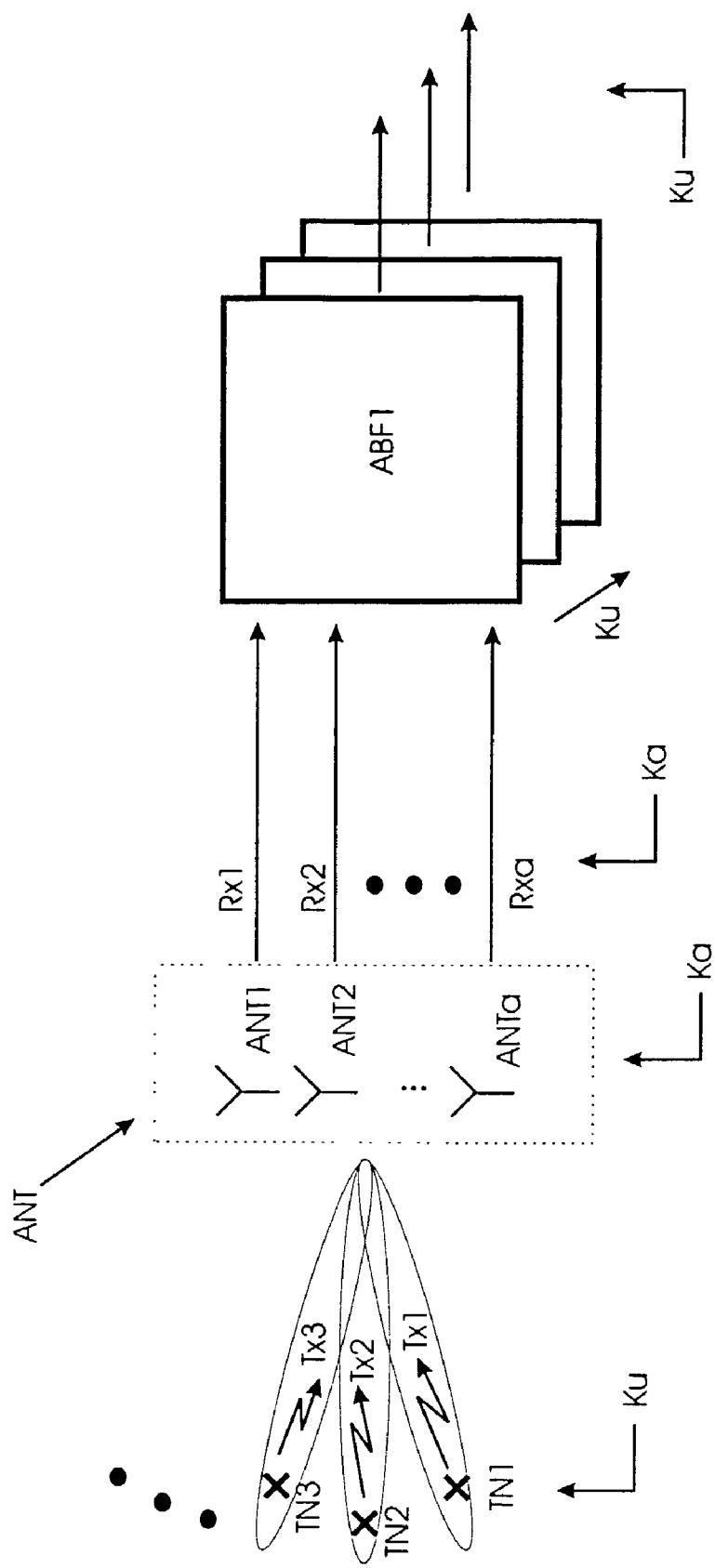
FIG. 2 shows a method for user-specific polar diagram forming according to the related art.

FIG. 2 shows a method for user-specific polar diagram forming according to the related art. In comparison with FIG. 1, a subscriber signal which is received with the aid of the antenna arrangement ANT, or a subscriber signal which is received by the Ka individual antennas ANT1, ANT2, . . . , ANTa, from a subscriber TN1 is passed as Ka antenna signals Rx1, Rx2, . . . , Rxa to a total of Ka inputs of a user-specific, adaptive beam forming unit ABF1, which is used to calculate user-specific polar diagrams.

The user-specific, adaptive beam forming unit ABF1 may be in the form of an eigen beam former, for example in radio communications system using CDMA access methods.

The user-specific adaptive method described here is characterized by the capability to deliberately mask out disturbing interference signals on a user-specific basis, and by a full adaptation capability of the polar diagrams which are in each case calculated for each of the Ku subscribers. However, this involves a high level of complexity in the radio communications system. For example, the polar diagrams are in this case used to separate and mask out disturbing interference signals TX2 and TX3 from subscribers TN2 and TN3 deliberately from a useful signal TX1 from a subscriber TN1.

Figure 3:
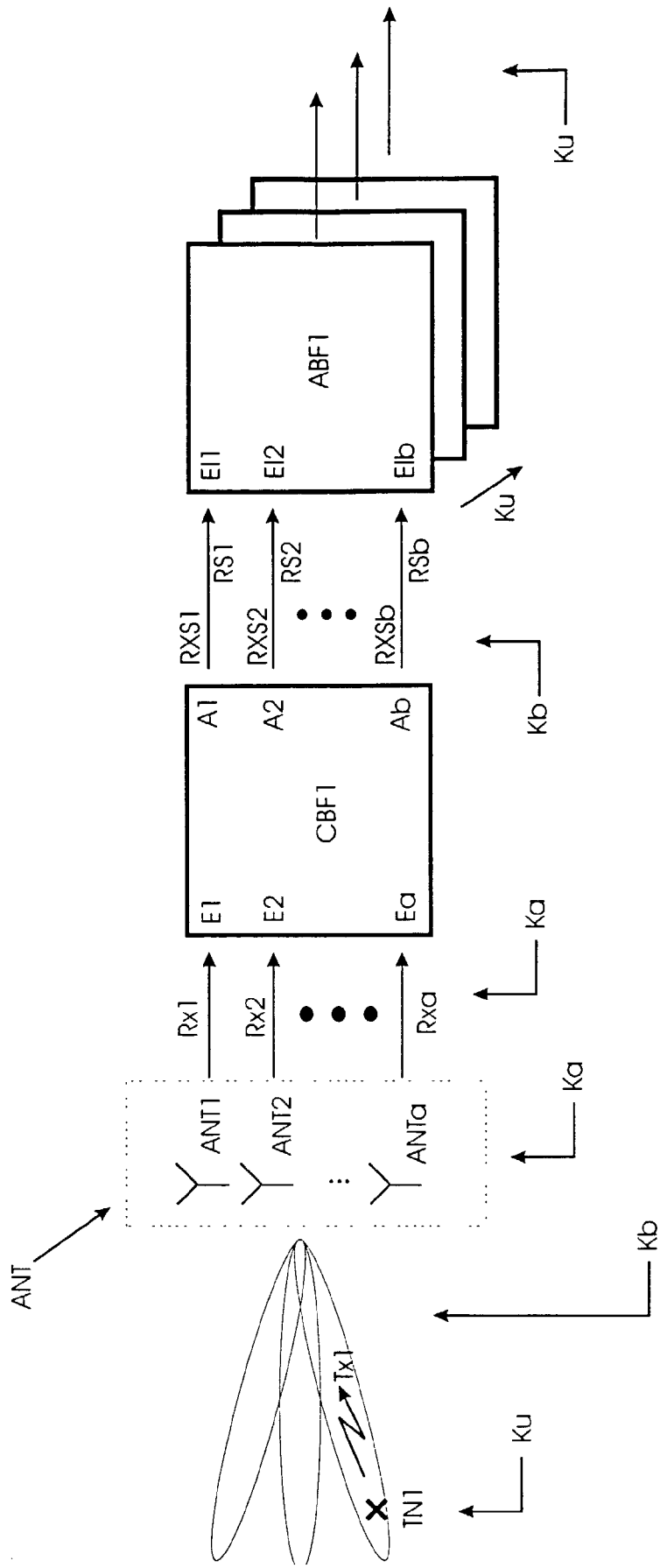
FIG. 3 shows a circuit example relating to the implementation of the method according to one aspect of the invention.

FIG. 3 shows a circuit example relating to the implementation of the method according to one aspect of the invention. In comparison with FIG. 1 and FIG. 2, the common polar diagram forming is combined with the user-specific polar diagram forming.

The Ka antenna signals Rx1 to Rxa, which are received by the Ka individual antennas ANT1 to ANTa, from a subscriber TN1 who has sent a subscriber signal TX1, are passed as Ka input signals to a common beam forming network CBF1, which has a total of Ka inputs E1, E2, ..., Ea for receiving the Ka antenna signals Rx1 to Rxa. The common beam forming network CBF1 uses this to form Kb sum signals RXS1, RXS2, ..., RXSb, which are passed to a total of Kb outputs A1, A2, ..., Ab of the common beam forming network. Each individual one of the Kb outputs A1, A2, ..., Ab is in this case associated in a fixed manner with in each case one of Kb polar diagrams.

This association process is carried out jointly for all Ku subscribers, with the sum signals RXS1 to RXSb which are formed in this way for an individual subscriber being passed together with those from all the other subscribers as overall signals RS1, RS2, ..., RSb via the respectively associated outputs A1, A2, ..., Ab of the common beam forming network CBF1 as input signals to Kb inputs EI1, EI2, ..., EIb of a user-specific beam forming unit ABF1, which is used to carry out a user-specific selection of a subset of polar diagrams, and for user-specific processing of this subset.

This combination combines the advantages of the two methods described in FIG. 1 and FIG. 2, in particular the full adaptation capability and the suppression of disturbing interference signals, while at the same time reducing the complexity, with this being achieved by the common beam forming network CBF1 in combination with the user-specific selection process.

Figure 4:
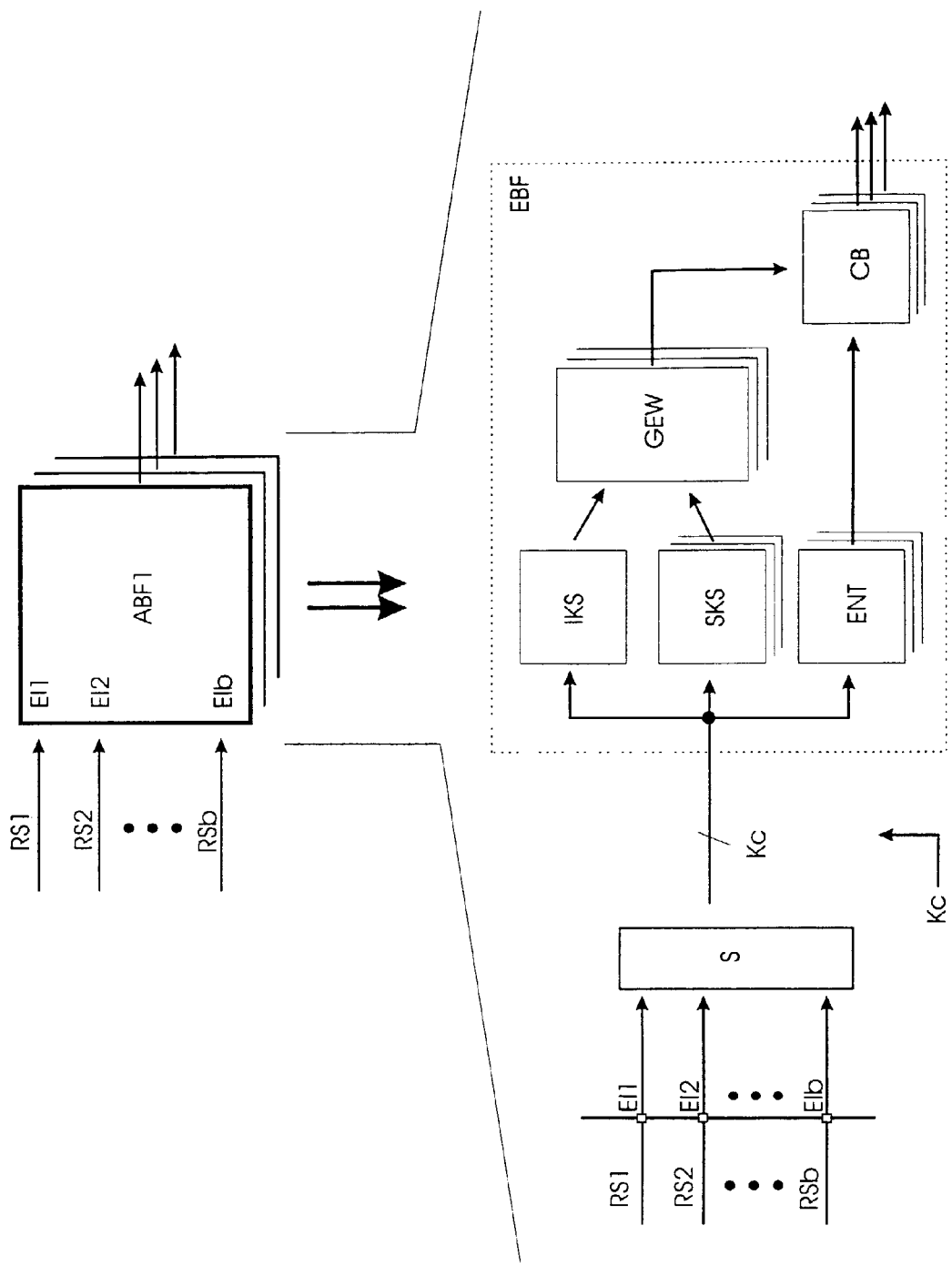
FIG. 4 shows a circuit example relating to the implementation of the user-specific beam forming unit in a circuit as shown in FIG. 3.

FIG. 4 shows a circuit example relating to the implementation of the user-specific beam forming unit ABF1 in a circuit as shown in FIG. 3.

By way of example, this is based on a radio communications system using CDMA access methods.

The overall signals RS1, RS2, ..., RSb from all Ku subscribers are passed as input signals to the Kb inputs EI1, EI2, ..., EIb of the user-specific beam forming unit ABF1, which has an eigen beam former EBF and a selector S. The selector S is used to carry out a user-specific selection of a subset Kc from the Kb overall signals from the total of Ku subscribers. This selected subset Kc is supplied as input signals to the eigen beam former EBF.

The eigen beam former EBF uses the signals from the subset Kc and with the aid of an interference covariance estimation device IKS which is arranged there to form an interference covariance matrix, and with the aid of a signal covariance estimation device SKS which is likewise arranged there, to form a signal covariance matrix from the respectively supplied signals in the subset Kc.

Weights, which are passed to a combiner CB, are calculated in each case adaptively and on a user-specific basis by a weighting device GEW, using eigenvalue decompositions with the aid of the signal covariance matrix and the interference covariance matrix.

The signals in the subset Kc are passed as output signals for the selector to a despreading device ENT, with whose aid they are likewise passed, as despread input signals, to the combiner CB. The combiner is used to weight and to add up the Kc output signals from the selector. These user-specific sum signals are then processed further.

Thus, in summary, the common beam forming network CBF1 can be used to associate polar diagrams with the antenna signals. A selector S selects a subset Kc, which is less than or equal to the number of polar diagrams Kb of the antenna arrangement, on a user-specific basis from the overall signals RS1 to RSb. This is done for each individual one of the total of Ku subscribers. An eigen polar diagram forming algorithm is carried out by the beam forming unit ABF1 on the signals from the subset Kc.

Both despreading and estimation of the covariance matrix as well as eigen value decomposition are simplified by the preselection of polar diagrams using the common beam forming network CBF1, and the overall complexity is reduced.

In this case, the selector S allows a smooth transition between pure common polar diagram forming and pure user-specific polar diagram forming. This transition is set by the respective subset Kc selected from the overall signals. If Kc is allocated the value 1, then one of the Kb inputs EI1 to EIb is considered, and this corresponds to common polar diagram forming. If Kb is used as the subset Kc, then this corresponds to pure user-specific polar diagram forming.

The invention has been described in detail with particular reference to preferred embodiments thereof and examples, but it will be understood that variations and modifications can be effected within the spirit and scope of the invention.

What is claimed is:

1. A method for forming polar diagram in a radio communications system using multiple access methods and with Ku subscribers, comprising:

transmitting a subscriber signal from an individual subscriber to an antenna arrangement, which has Kb polar diagrams and Ka individual antennas, which produce Ka antenna signals from the subscriber signal, passing the Ka antenna signals as input signals to a common beam forming network with Ka inputs and Kb outputs, forming Kb weighted sum signals in the common beam forming network from the Ka antenna signals, the Kb weighted sum signals being formed for each of the Ku subscribers, the Kb weighted sum signals being sent respectively to the Kb outputs of the common beam forming network, assigning each of the Kb outputs of the beam forming network one, and only one, of the Kb polar diagrams of the antenna arrangement, for each of the Ku subscribers, passing the Kb weighted sum signals from the common beam forming network respectively to Kb inputs of an adaptive user-specific beam forming unit with Kb inputs, and selecting a user-specific polar diagram for each of the Ku subscribers, the user-specific polar diagrams being selected in the beam forming unit from the Kb weighted sum signals passed to the Kb inputs of the beam forming unit, wherein a selector is provided in the user-specific beam forming unit to select, on a user-specific basis, a subset of Kc signals from the Kb weighted sum signals, the user-specific polar diagram is selected based on the Kc signals, and to form the subset of Kc signals, the selector selects the Kb weighted sum signals whose user-specific weighted combination forms an optimum ratio between a respective subscriber useful signal and disturbing interference signals and noise.

2. The method as claimed in claim 1, wherein the common beam forming network converts the Ka antenna signals for each of the Ku subscribers into baseband signals and then performs analog to digital conversion on the baseband signals to form digital baseband signals which are combined to form the Kb weighted sum signals such that the respectively assigned polar diagram covers a defined three-dimensional area.

3. The method as claimed in claim 1, wherein
the common beam forming network combines the Ka antenna signals for each of the Ku subscribers on a carrier-frequency basis to form the Kb weighted sum signals, such that the respectively assigned polar diagram covers a defined three-dimensional area, and
the Kb weighted sum signals are converted to baseband signals, and analog to digital conversion is performed on the baseband signals.

4. The method as claimed in claim 3, wherein the Ka antenna signals are combined to form the Kb weighted sum signals by a Butler matrix.

5. The method as claimed in claim 1, wherein the subset of Kc signals are passed to an eigen beam former.

6. The method as claimed in claim 5, wherein the subset of KC signals passed to the eigen beam former:
are used to form an interference covariance matrix with an interference covariance estimation device,
are used to form a signal covariance matrix with a signal covariance estimation device, and
are passed to a despreading device to form despread output signals.

7. The method as claimed in claim 6, wherein weights are calculated from the individual polar diagrams with a weighting device and with the interference covariance matrix and the signal covariance matrix, using eigen value decompositions, and the weights are passed together with despread output signals to a combiner.

8. The method as claimed in claim 7, wherein an eigen beam is formed with the combiner.

9. The method as claimed in claim 1, wherein the selector provides a smooth transition between a pure common polar diagram and a pure user-specific polar diagram, the smooth transition being provided with the subset of Kc signals.

10. The method as claimed in claim 4, wherein the subset of Kc signals are passed to an eigen beam former.

11. The method as claimed in claim 10, wherein the subset of KC signals passed to the eigen beam former:
are used to form an interference covariance matrix with an interference covariance estimation device,
are used to form a signal covariance matrix with a signal covariance estimation device, and
are passed to a despreading device to form despread output signals.

12. The method as claimed in claim 1, wherein weights are calculated from the individual polar diagrams with a weighting device and with the interference covariance matrix and the signal covariance matrix, using eigen value decompositions, and the weights are passed together with despread output signals to a combiner.

13. The method as claimed in claim 12, wherein an eigen beam is formed with the combiner.

14. The method as claimed in claim 13, wherein the selector provides a smooth transition between a pure common polar diagram and a pure user-specific polar diagram, the smooth transition being provided with the subset of Kc signals.

* * * * *